United States Patent [19]

Brown et al.

[11] Patent Number: 4,925,616
[45] Date of Patent: May 15, 1990

[54] METHOD OF PROTECTING A CASED PIPELINE FROM CORROSION

[75] Inventors: Ronald W. Brown, Broussard, La.; Roy F. House, Houston, Tex.

[73] Assignee: Venture Innovations, Inc., Lafayette, La.

[21] Appl. No.: 242,807

[22] Filed: Sep. 12, 1988

[51] Int. Cl.5 .......................... B29C 39/02; B32B 1/08
[52] U.S. Cl. ................... 264/262; 106/123.2
[58] Field of Search ...................... 264/262; 106/123.2

[56] References Cited

U.S. PATENT DOCUMENTS

| | | | |
|---|---|---|---|
| 2,180,695 | 11/1939 | Rembert | 264/262 |
| 2,347,855 | 5/1944 | Varga | 264/262 |
| 2,373,709 | 4/1946 | Rice | 106/123.2 |
| 2,403,293 | 7/1946 | Miskel | 106/123.2 |
| 2,405,021 | 7/1946 | Durant | 264/262 |
| 2,418,075 | 5/1947 | Kollen | 106/123.2 |
| 2,647,063 | 7/1953 | Willis | 106/123.2 |
| 2,785,089 | 3/1957 | Lanteri | 106/123.2 |
| 2,845,361 | 7/1958 | Maddox | 106/123.2 |
| 2,845,657 | 8/1958 | Beare | 264/262 |
| 3,709,751 | 1/1973 | Carlson | 264/262 |
| 4,256,491 | 3/1981 | Tate | 106/123.2 |

Primary Examiner—Jay H. Woo
Assistant Examiner—Jeremiah F. Durkin, II
Attorney, Agent, or Firm—Roy F. House

[57] ABSTRACT

Tall oil pitch is used as casing fillers in the interstitial spaced between a pipeline and a surrounding casing pipe. The tall oil pitch can be used per se or can be modified by: increasing its specific gravity above 1.0; increasing its pour point or dropping point; increasing its viscosity; decreasing its pumpability temperature. The tall oil pitch is pumped into the interstitial space between the pipeline and the casing pipe.

11 Claims, No Drawings

METHOD OF PROTECTING A CASED PIPELINE FROM CORROSION

FIELD OF THE INVENTION

The invention relates to non-conductive, electrically insulating compositions which are useful in filling the annular space between a metallic casing and a metallic conduit, such as a pipe for the transportation of oil, gas, or other fluids, particularly where the conduit is being cathodically protected.

BACKGROUND OF THE INVENTION

Metallic pipelines are commonly used to transport oil, gas, and many other liquids. As soon as a pipeline is buried, corrosion, which is a natural electrochemical process, commences at locations on the pipe which are not covered by a protective coating. It is a common practice to apply cathodic protection, a technique to prevent the corrosion of a metal surface by making that surface the cathode of an electrochemical cell, to prevent or decrease the corrosion of buried pipelines at defects and anomalies in the pipeline coating.

Casings are commonly used to surround and protect pipelines where the pipelines cross beneath roadways, railroads, and bodies of water such as streams, rivers, and canals. Contact of a bare casing pipe with the pipeline usually results in a substantial lowering of the pipeline electrical potential and an accompanying loss of cathodic protection. Thus measures are taken during construction of the buried pipeline crossing to prevent any contact between the metal casing and the metal pipeline. Nevertheless, an electrical "short" may occur caused by water in the casing, allowing current to flow through the water and on to the pipeline within the casing.

The U.S. Department of Transportation has regulatory authority over interstate pipelines. Their regulations require that all highway and railroad crossings involving cathodically protected pipelines must be electrically isolated from the casing, or other measures must be used to mitigate or monitor galvanic corrosion of the pipeline inside the shorted casing. Once a "shorted casing" is found, measures must be taken to correct or negate the adverse effects of the shorted casing, including either clearing the short, if practical, or filling the casing/pipeline interstitial space with a high dielectric casing filler or other material which provides a corrosion inhibiting environment.

Various materials have been used as casing fillers. They are generally of two types, either "hot fill" or "cold fill". The "hot fill" type, represented by various petroleum waxes and petrolatums, are applied hot such that the material is above its melting point. After being pumped into the casing/pipeline interstitial space, it cools and hardens in place. The "cold fill" type of casing filler is applied by pumping a viscous material at ambient temperatures into the casing/pipeline interstitial space. This type of filler is typically a gelled or viscosified petroleum oil having a grease-like consistency.

Cushing U.S. Pat. No. 3,774,403 discloses the use of a polymeric electrically nonconductive material, such as polyurethane foam, as a casing filler. Kennedy, Jr. U.S. Pat. No. 4,469,469, incorporated herein by reference, discloses the typical means by which a casing filler is applied to the interstitial space between the pipeline and casing.

SUMMARY OF THE INVENTION

We have now found that tall oil pitch can be used as a casing filler. Also, the tall oil pitch can be partially saponified to provide casing fillers having a higher dropping or congealing temperature. Further, the tall oil pitch can be formulated to have a specific gravity greater than water, and it can be formulated to have a lower pour point on pumpability temperature.

Accordingly, it is an object of this invention to provide a method of protecting a first metallic conduit from corrosion wherein the first conduit is encased within a second conduit of larger diameter, which comprises filling the interstitial space between the first and second conduits with tall oil pitch or a material derived therefrom.

It is another object of this invention to provide tall oil pitch based casing filler compositions.

Other objects and advantages of this invention will become apparent to one skilled in the art upon reading this specification and the appended claims.

While the invention is susceptible of various modifications and alternative forms, specific embodiments thereof will hereinafter be described in detail and shown by way of example. It should be understood, however, that it is not intended to limit the invention to the particular forms disclosed, but on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS

Tall oil pitch is the by-product from the distillation of crude tall oil which has been produced by acid treatment of black liquor soap from the sulfate or Kraft paper process. Tall oil pitch is the distillation residue that remains after tall oil fatty acids and tall oil rosin have been distilled by fractional distillation from crude tall oil. The composition of tall oil pitch and hence its properties may vary because of variations in the crude tall oil composition and in the degree of distillation. Typically, pitches may vary in softening points from about 20° C. (68° F.) to about 50° C. (112° F.).

Tall oil pitch is commerically available. It is known to contain rosin, high boiling neutral oils, dimers and higher oligomers of unsaturated tall oil fatty acids and rosin, and long-chain alcohol esters and sterol esters of fatty acids. Tall oil pitch is often sold or used for fuel, and as such is wasted from a chemists' point of view.

Although no industry standards exist for using fillers, desirable properties which a casing filler should possess are:

(1) electrically non-conductive;
(2) high flash point;
(3) does not burn when the source of ignition is removed;
(4) have a sufficiently high viscosity that the casing filler either be an essentially non-pourable, semi-solid liquid or gel, or a solid at the temperature within the casing-pipeline interstitial space;

(5) have a specific gravity near to and preferably greater than 1.0 to help prevent the entry of water into the casing-pipeline interstitial space;

(6) have good coating/adhesive characteristics to thoroughly coat and protect "holidays" (defects in the pipeline coating where the metal is exposed);

(7) have no known environmental hazards; and (8) be non-hazardous under the Occupational Safety and Health Administrations' Hazard Communication Standard, 29 C.F.R. 1910.1200.

We have determined that tall oil pitch has the following dielectric properties: a dielectric strength greater than 2000 volts as measured by the American Petroleum Institute's Recommended Procedure 13 B (API RP 13B); a dielectric constant of 2.26 as measured by ASTM D 924; and a volume resistivity of $2.6 \times 10^{12}$ ohm-centimeters as measured by ASTM D 1169. These data indicate excellent dielectric properties for a casing filler. Tall oil pitch has a flash point of about 500° F. (260° C.) (ASTM D 92). Although the tall oil pitch will burn, once the source of ignition is removed, the tall oil pitch ceases to burn and the flame is extinguished. Tall oil pitch has no known environmental hazards and it is non-hazardous under OSHA's Hazard Communication Standard. The specific gravity of tall oil pitch is 0.998, thus very close to that of water. The specific gravity can be increased, if desired, by adding a weighting agent. Thus any material which has a specific gravity greater than 1.0 and which is non-reactive with the tall oil pitch can be added. It is preferred that the weighting agent have a specific gravity in the range from about 1.25 to about 5.25, most preferably from about 1.5 to about 4.5. Examplary weighing agents are clays and other minerals, such as anhydrite, anthophyllite, antigorite, apatite, attapulgite, barite, bauxite, bentonite, calcite, colemanite, dolomite, gypsum, kaolinite, magnesite, muscovite, pyrophyllite, sepiolite, sulfur, talc, ulexite, vermicullite, and wollastonite, pigments, plastics, resins, and the like.

It is preferred that solid, particulate weighting agents have an acicular or fibrous particle morphology such that their suspension in the tall oil pitch is increased by the so-called "brush-heep" effect. Suspension of the weighting agent will normally not be a problem once the casing filler is in place within the casing-pipeline interstitial space since the casing filler will be an extremely viscous liquid or a solidified liquid. However, a suspension additive may be required to suspend the weighting agent at elevated temperatures since the viscosity of the casing filler decreases with an increase in temperature.

A variety of means exist to suspend the weighting agent. Thus a surfactant can be added to the casing filler to adsorb on or to react with the surface of the weighting agent. The surfactant, which should be added in an amount sufficient to suspend the weighting agent, is preferably an amino compound containing at least one aliphatic radical having at least ten carbon atoms and containing at least one primary amino, secondary amino, tertiary amino, or quaternary ammonium radical.

Preferred amino compounds have the structural formula:

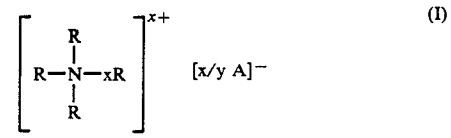

where each R is independently selected from the group consisting of H, aliphatic radicals containing from one to thirty carbon atoms, and benzyl, x is 0 or 1, A is an anion, and y is the valence of A, provided that at least one R radical contains at least ten carbon atoms.

Other suspension additives which may be added to the casing filler include organophilic clays, polymers, and the like. Mixtures of suspension additives may be used. Exemplary organophilic clays are clays selected from the groups consisting of attapulgite, sepiolite, and smectite group clays, and mixtures thereof, which have been reacted with one or more amino compounds having the structural formula (1). Such organophilic clays will also increase the specific gravity of the casing filler and can be used as the sole weighting agent if desired. Thermoplastic polymers will increase the viscosity of the casing filler upon heating the casing filler - polymer mixture above the softening point of the polymer and thereafter cooling the casing filler below the softening point of the polymer to re-solidify the polymer. Preferred polymers are polyethylene, polypropylene, and polystyrene. Solid suspension additives having a specific gravity greater than 1.0 can also function as weighting agents such that no supplementary suspension agent is necessary.

Liquid weighting agents can also be added to the tall oil pitch to increase the specific gravity of the casing filler. Preferably the liquid weighting agent is miscible with the tall oil pitch. However, liquid weighting agents which are immiscible with the tall oil pitch can be emulsified in the tall oil pitch to form a homogeneous casing filler. In order that the dielectric properties of the tall oil pitch are not adversely affected for its use as a casing filler, it is preferred that the dielectric constant of the liquid weighting agent be less than about 10.

The weighting agent and suspension agent, if added, can be mixed into the tall oil pitch by any suitable equipment. These materials can be added to the tall oil pitch as it is pumped from a heated container into the casing-/pipeline interstital space, if desired.

As indicated, the casing filler should be essentially immobile at the prevailing temperature within the casing/pipeline interstitial space, i.e., it should be an extremely viscous non-pourable liquid, semi-solid gel, or solidified liquid. The addition of solid weighting agents and/or solid suspending agents of the type disclosed herein will increase the viscosity of the casing filler. Other methods of increasing the viscosity of the casing filler if desired include partial saponification of the tall oil pitch. This can be accomplished by reacting the tall oil pitch with up to about 5% by weight of the tall oil pitch of a base. Preferred bases are selected from the group consisting of alkali metal hydroxides, alkali metal carbonates, alkaline earth metal hydroxides, alkaline earth metal oxides, alkaline earth metal carbonates, zinc oxide, zinc hydroxide, zinc carbonate, basic zinc carbonate, and mixtures thereof, or materials containing one or more of these bases. Most perferred bases are the alkaline earth and zinc compounds listed. Since these bases have a specific gravity greater than 1.0, the partial saponficiation of the tall oil pitch with the base also increases the specific gravity of the casing filler prepared therefrom. Partial saponification of the tall oil pitch increases the pour point, the softening temperature, and dropping point of the pitch as well as the viscosity of the pitch. This is of particular value where the pipeline contains liquids at elevated temperatures (above prevailing ground temperature).

Other methods of increasing the pour point or dropping point of the tall oil pitch include reacting the tall oil pitch with an organic anhydride, such as maleic anhydride, followed by saponification with a multivalent metal hydroxide, such as calcium hydroxide, as is disclosed in Fang U.S. Pat. No. 4,151,002, incorporated herein by reference. Additionally, the tall oil pitch can be esterified with an alcohol, preferably with a polyfunctional alcohol followed by reaction with a polyfunctional cross-linking agent such as a diisocyanate.

The casing filler is pumped into the sealed casing-pipeline interstitial space to substantially fill the space. Any water in the interstitial space is displaced by the casing filler, generally from the opposite end of the interstitial space from which the space is filled. The casing filler thus prevents the entry of water into the interstitial space, and provides an electrically non-conductive, corrosion inhibiting environment to protect the interior pipe from corrosion.

In a preferred method of placement, the water present in the casing-pipeline interstitial space is removed to the greatest possible extent before pumping the casing filler into the space. Thus the water can be pumped out and compressed air can also be used to force water out of the interstitial space. Any water remaining in the interstitial space before placement of the casing filler can be treated with corrosion inhibitors, oxygen scavengoers, biocides, and the like.

Tall oil pitch may be pumped below its softening temperature with the use of an appropriate mastic-type pump. The viscosity of the tall oil pitch or the casing filler formulated therefrom increases with a decrease in temperature until a temperature is reached at which it is no longer pumpable even with a mastic-type pump. Thus, depending on the ambient prevailing temperature, the casing filler may need to be heated. In a "hot fill" process, the casing filler will be heated to a temperature at which it is of relatively low viscosity and readily pumpable. Upon placement into the casing-/pipeline interstitial space, the casing filler will increase in viscosity as it cools to the prevailing ground temperature.

For long cased pipeline crossings, hot air can be blown into the casing-pipeline interstitial space in order to increase the temperature therein. The increased temperature will decrease the cooling rate of the casing filler and thus decrease the rate of viscosity increase of the casing filler enabling a longer pumping time to ensure complete filling of the interstitial space.

The casing filler can be formulated to have a lower pumpability temperature than tall oil pitch. Thus the tall oil pitch can be mixed with a water insoluble, miscible liquid which has a lower viscosity and pour point than the tall oil pitch. It is preferred that the miscible liquid have a low dielectric constant, preferably less than about 10, most preferably less than about 6, and a high flash point, preferably greater than about 65.5° C. (150° F.), most preferably greater than about 93.3° C. (200° F.). The specific gravity of this casing filler can be increased as previously set forth herein.

The following non-limitive examples will further illustrate the invention.

EXAMPLE 1

Tall oil pitch having a Brookfield Model RVF viscosity at 10 rpm and 72° F. of 190,000 centipoise is pumped with a Grayco Bulldog pump into the sealed space between a pipeline and a casing via the lower casing vent until the tall oil pitch exits from the upper casing vent. The pitch forms a tacky, viscous seal of the casing-/pipeline interstitial space to prevent the entry to water into the space and to eliminate any electrical contact between the casing and the pipeline when the pipeline is under cathodic protection. Before placement of the tall oil pitch, the water in the casing/pipeline interstitial space is pumped out and the interstitial space blown dry with compressed air.

EXAMPLE 2

A casing filler having a lower pumpability temperature and higher specific gravity was prepared by mixing together 56 parts by weight tall oil pitch, 14 parts by weight XTOL P, a tall oil fraction having a higher concentration of tall oil fatty acids and rosin acids than does tall oil pitch, 28 parts by weight attapulgite (ground through a Micropulverizer), and 2 parts by weight dimethyl dihydrogenatedtallow ammonium chloride, 75% active in an isopropanol/water solvent. When tested by API RR 13B, the composition exhibited a voltage breakdown of 300 volts. The composition was then heated to 130° C. while mixing to drive off the water in the composition, primarily present in the attapulgite which contained about 12% moisture, to give a casing filler having a voltage breakdown by API RP 13B greater than 2000 volts and a specific gravity of about 1.2. This casing filler could be pumped with a mastic-type pump at about 5° C.

EXAMPLE 3

Example 2 was repeated except that there was used 49 parts by weight tall oil pitch, 21 parts by weight crude tall oil, 28 parts by weight attapulgite, and 2 parts by weight dimethyl dihydrogenatedtallow ammonium chloride (75% active). A casing filler having similar properties was obtained.

Example 4

A casing filler having a specific gravity of about 1.2 was prepared by mixing and heating to 145° C. the following: 18 parts by weight tall oil pitch, 19.5 parts by weight finely ground attapulgite, and 2.5 parts by weight methyl benzyl dihydrogenatedtallow ammonium chloride (75% active). The voltage breakdown of this casing filler by API RP 13 B was greater than 2000 volts. A small amount of this casing filler was placed on the end of spatula and a lighted wooden match placed under it. The casing filler decreased in viscosity and flowed off of the spatula. The casing filler burned when the match was placed in the pool of liquid pitch. When the match was removed, the pitch ceased to burn. This casing filler exhibited no settling of the attapulgite in an oven at 140° F. for one week.

EXAMPLE 5

A casing filler was prepared by mixing together at ambient temperature 81.3 parts by weight tall oil pitch, 16.3 parts by weight calcined attapulgite having a moisture content of 1%, an average particle size of 2 microns, and a specific gravity of 2.47, and 2.4 parts by weight of dimethyl dihydrogenatedtallow ammonium chloride (75% active). This casing filler had a voltage breakdown greater than 2000 volts (API RP 13 B) and a specific gravity of about 1.15. This casing filler exhibited no settling of the calcined attapulgite when placed in an oven at 140° F. for one week.

EXAMPLE 6

Tall oil pitch, having a dropping point of about 44° C, was reacted with either 1%, 2%, or 3% by weight of the tall oil pitch of sodium hydroxide (added as a 50% by weight solution) at 150° C. until all of the water was removed. On cooling the partially saponified tall oil pitches exhibited a dropping point of about 55° C., 70° C., and 105° C., respectively. The voltage breakdown by API RO 13 B was greater than 2000 volts for all three samples. These partially saponified tall oil pitches can be used as casing fillers by heating them to a temperature such that their viscosity is sufficiently low to be pumped. Upon placement in a casing/pipeline interstitial space, they will increase in viscosity while cooling to the prevailing ground temperature.

EXAMPLE 7

A casing filler was prepared by partially saponifying tall oil pitch with 5% by weight calcium hydroxide (added as a 50% mixture in water) at 150° C. until all of the water was removed. The specific gravity of the casing filler was further increased by the addition of 20% (by weight of the tall oil pitch) of the calcined attapulgite of Example 5.

We claim:

1. In a method of protecting a metallic underground pipeline from corrosion wherein the pipeline is encased within a casing pipe of larger diameter, and wherein the interstitial space between the pipeline and the casing pipe is filled with a non-conductive insulating material wherein the improvement comprises pumping into the interstitial space an insulating material which has a dielectric strength greater than 2000 volts as measured by the American Petroleum Institute's Recommended Procedure 13 B, a dielectric constant of about 2.26 as measured by ASTM D924, a volume resistivity of about $2.26 \times 10^{12}$ ohm-centimeters as measured by ASTM D1169, and a flash point of at least about 500° F. as measured by ASTM D92, said insulating material having the characteristic that, if burning, it ceases to burn and the flame is extinguished once the source of ignition is removed, wherein said insulating material further comprising tall oil pitch.

2. The method of claim 1 wherein the tall oil pitch is reacted with a base in an amount sufficient to raise the dropping point of the tall oil pitch.

3. The method of claim 2 wherein the tall oil pitch is reacted with a base selected from the group consisting of sodium hydroxide, potassium hydroxide, lithium hydroxide, calcium hydroxide, magnesium hydroxide, calcium oxide, magnesium oxide, and mixtures thereof.

4. The method of claim 2 wherein the tall oil pitch is reacted with up to about 5% by weight of calcium hydroxide.

5. The method of claim 1 wherein the tall oil pitch contains sufficient weight material such that the specific gravity of the mixture of tall oil pitch and weight material is greater than 1.0.

6. The method of claim 5 wherein said mixture also contains a suspending agent in an amount sufficient to maintain the weight material in suspension in the mixture at elevated temperatures to which the mixture is subjected.

7. The method of claim 5 wherein the weight material has an acicular of fibrous particle morphology.

8. The method of claim 7 wherein the mixture also contains a suspending agent in an amount sufficient to maintain the weight material in suspension in the mixture at elevated temperatures to which the mixture is subjected.

9. The method of claim 5 wherein the weight material is attapulgite.

10. The method of claim 6 wherein, the weight material is attapulgite and wherein the suspending agent is an amino compound containing at least one aliphatic radical having at least 10 carbon atoms.

11. The method of claim 1, 5, 6, 7, 8, 9, or 10, wherein the tall oil pitch is mixed with sufficient miscible liquid such that the mixture of tall oil pitch and the miscible liquid has a lower pour point than the tall oil pitch.

* * * * *